US012806563B2

(12) United States Patent
Ko et al.

(10) Patent No.: US 12,806,563 B2
(45) Date of Patent: Nov. 24, 2026

(54) ADSORPTION TYPE AIR DRYER AND METHOD OF CONTROLLING THE SAME

(71) Applicant: SAMSUNG ELECTRONICS CO., LTD., Suwon-si (KR)

(72) Inventors: Yujin Ko, Suwon-si (KR); Hyunho Yun, Suwon-si (KR); Jungsoo Kang, Suwon-si (KR); Sungmin Jang, Suwon-si (KR); Hyunmin Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 322 days.

(21) Appl. No.: 18/611,133

(22) Filed: Mar. 20, 2024

(65) Prior Publication Data

US 2024/0316493 A1 Sep. 26, 2024

(30) Foreign Application Priority Data

Mar. 24, 2023 (KR) ........................ 10-2023-0039218
May 15, 2023 (KR) ........................ 10-2023-0062703

(51) Int. Cl.
*B01D 53/26* (2006.01)
*B01D 53/04* (2006.01)

(52) U.S. Cl.
CPC ....... *B01D 53/261* (2013.01); *B01D 53/0454* (2013.01); *B01D 2257/80* (2013.01); *B01D 2259/40088* (2013.01)

(58) Field of Classification Search
None
See application file for complete search history.

(56) References Cited

U.S. PATENT DOCUMENTS 11,406,912 B2 8/2022 Litt et al.
12,629,629 B2 * 5/2026 Venkatesan ........ B01D 53/0462
(Continued)

FOREIGN PATENT DOCUMENTS

CN 201768476 U * 3/2011 ........... B01D 53/261
KR 1993-0003658 Y1 6/1993
(Continued)

OTHER PUBLICATIONS

KR20220111047A_ENG (Espacenet machine translation of Seo) (Year: 2022).*

(Continued)

*Primary Examiner* — Gabriel E Gitman
(74) *Attorney, Agent, or Firm* — Sughrue Mion, PLLC

(57) ABSTRACT

An air dryer includes a first adsorption tower configured to perform any one of a compressed air dehumidification process and a regeneration process of a first adsorbent provided therein, a second adsorption tower configured to perform a regeneration process of a second adsorbent or alternately perform a compressed air dehumidification process, in response to an operation of the first adsorption tower, and a controller configured to (i) control the operation of the first adsorption tower for the first adsorption tower to perform either the compressed air dehumidification process or the regeneration process of the first adsorbent and (ii) control the operation of the second adsorption tower for the second adsorption tower to perform either the compressed air dehumidification process or the regeneration process of the second adsorbent.

19 Claims, 7 Drawing Sheets

(56) References Cited

U.S. PATENT DOCUMENTS

| | | | | |
|---|---|---|---|---|
| 2010/0257884 | A1 | 10/2010 | Matsui | |
| 2019/0160418 | A1 * | 5/2019 | Matsumoto | B01D 53/261 |

FOREIGN PATENT DOCUMENTS

| | | | | |
|---|---|---|---|---|
| KR | 0121781 | Y1 | 8/1998 | |
| KR | 10-1100192 | B1 | 12/2011 | |
| KR | 10-1687360 | B1 | 12/2016 | |
| KR | 20180035351 | A * | 4/2018 | B01D 53/0407 |
| KR | 10-1906529 | B1 | 10/2018 | |
| KR | 10-2022-0111047 | A | 8/2022 | |
| KR | 20220111047 | A * | 8/2022 | B01D 53/0454 |
| KR | 10-2447032 | B1 | 9/2022 | |

OTHER PUBLICATIONS

KR20180035351A_ENG (Espacenet machine translation of Choi) (Year: 2018).*

CN201768476U_ENG (Espacenet machine translation of Peng) (Year: 2011).*

* cited by examiner

ADSORPTION TYPE AIR DRYER AND METHOD OF CONTROLLING THE SAME

CROSS-REFERENCE TO RELATED APPLICATIONS

This application is based on and claims priority to Korean Patent Application Nos. 10-2023-0039218, filed on Mar. 24, 2023, and 10-2023-0062703, filed on May 15, 2023, in the Korean Intellectual Property Office, the disclosures of which are incorporated by reference herein in their entirety.

BACKGROUND

The present disclosure relates to an adsorption type air dryer and a method of controlling the same, and more particularly, to an adsorption type air dryer including a plurality of adsorption towers and a method of controlling the same.

Compressed air is used for various purposes such as pressure control and fluid flow control in industrial facilities such as hydraulic, pneumatic, cooling and heating facilities, and cleaning facilities. Compressed air is obtained by compressing the air containing components such as nitrogen, oxygen, and moisture, wherein moisture that is condensed when the air is compressed needs to be removed with an air dryer before being used in various industrial fields. When compressed air is used without sufficiently removing moisture, various pneumatic devices may fail, and, in particular, problems due to moisture may occur in a workplace where precise work is demanded.

Air dryers for removing moisture generated from a compressor are generally classified into a refrigeration type, an adsorption type and an absorption type. In particular, the adsorption type air dryer is an air dryer that forcibly removes moisture by passing compressed air through an adsorbent that adsorbs moisture. For energy saving, research on minimizing the energy loss of an adsorption type air dryer is needed.

SUMMARY

The present disclosure provides an adsorption type air dryer that calculates a moisture load rate in real time and a method of controlling the same.

The present disclosure also provides an adsorption type air dryer capable of increasing or decreasing the process time for dehumidifying compressed air by calculating a moisture load rate in real time and a method of controlling the same.

According to an aspect of the present disclosure, there is provided an air dryer including a first adsorption tower configured to perform any one of a compressed air dehumidification process and a regeneration process of a first adsorbent provided therein, a second adsorption tower configured to perform a regeneration process of a second adsorbent or alternately perform a compressed air dehumidification process, in response to an operation of the first adsorption tower, and a controller configured to (i) control the operation of the first adsorption tower for the first adsorption tower to perform either the compressed air dehumidification process or the regeneration process of the first adsorbent and (ii) control the operation of the second adsorption tower for the second adsorption tower to perform either the compressed air dehumidification process or the regeneration process of the second adsorbent, wherein the controller controls at least one of the first adsorption tower and the second adsorption tower by using a first moisture load rate, which is a ratio of a pre-set moisture removal amount with respect to a first accumulated moisture removal amount accumulated in the first adsorption tower, and a second moisture load rate, which is a ratio of the pre-set moisture removal amount with respect to a second accumulated moisture removal amount accumulated in the second adsorption tower. As used herein, the phrase "at least one of A and B" has the same meaning as "A, B, or A and B."

According to another aspect of the present disclosure, there is provided a method of controlling an air dryer using a first adsorption tower and a second adsorption tower, the method including inputting a pre-set moisture removal amount of the air dryer, controlling operations of the first adsorption tower and the second adsorption tower, such that the first adsorption tower and the second adsorption tower perform any one of a compressed air dehumidification process or an adsorbent regeneration process, calculating a first accumulated moisture removal amount accumulated in the first adsorption tower or a second accumulated moisture removal amount accumulated in the second adsorption tower, and calculating a first moisture load rate, which is a ratio of the pre-set moisture removal amount with respect to the first accumulated moisture removal amount, or a second moisture load rate, which is a ratio of the pre-set moisture removal amount with respect to the second accumulated moisture removal amount, wherein, in the controlling of the operations of the first adsorption tower and the second adsorption tower, the compressed air dehumidification process of the first adsorption tower or the second adsorption tower is controlled based on the first moisture load rate or the second moisture load rate, respectively.

According to another aspect of the present disclosure, there is provided an air dryer including a main line interconnecting an inlet and an outlet and through which compressed air flows, a first adsorption tower installed on a first branch of the main line and configured to perform any one of a compressed air dehumidification process and a regeneration process of an adsorbent provided therein, a second adsorption tower installed on a second branch of the main line and configured to perform a regeneration process of an adsorbent or alternately perform a compressed air dehumidification process, in response to an operation of the first adsorption tower, a regeneration line branched from a position of the main line adjacent to the outlet and including a heater, and a controller configured to control operations of the first adsorption tower and the second adsorption tower, such that the first adsorption tower and the second adsorption tower perform any one of the compressed air dehumidification process or the adsorbent regeneration process, wherein the controller controls at least one of the first adsorption tower and the second adsorption tower by using a first moisture load rate, which is a ratio of a pre-set moisture removal amount with respect to a first accumulated moisture removal amount accumulated in the first adsorption tower, and a second moisture load rate, which is a ratio of the pre-set moisture removal amount with respect to a second accumulated moisture removal amount accumulated in the second adsorption tower.

BRIEF DESCRIPTION OF DRAWINGS

Embodiments of the present disclosure will be more clearly understood from the following detailed description taken in conjunction with the accompanying drawings in which.

DETAILED DESCRIPTION

Figure 1:
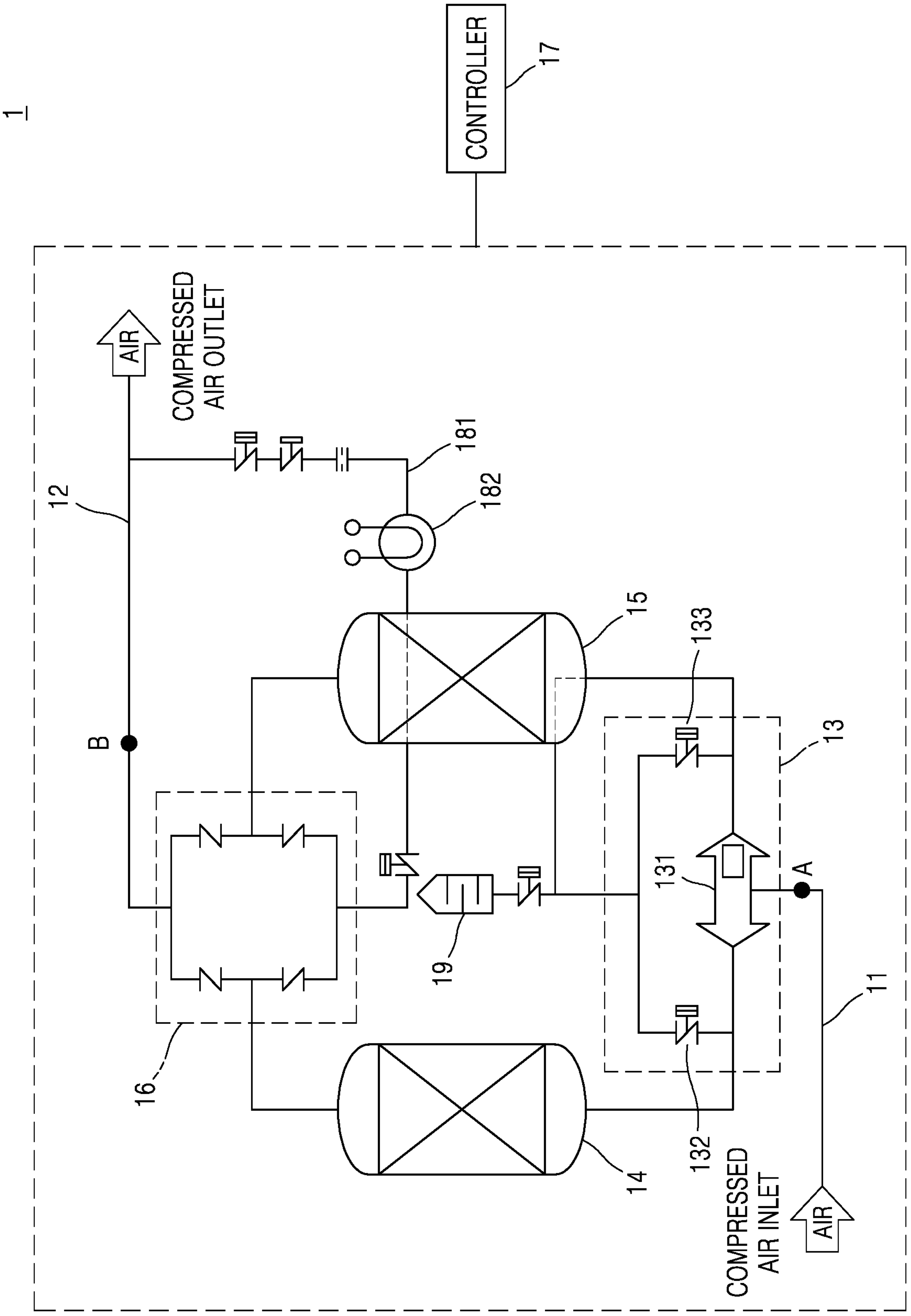
FIG. 1 is a schematic diagram showing a configuration of an adsorption type air dryer according to an embodiment.

FIG. 1 is a schematic diagram showing a configuration of an adsorption type air dryer according to an embodiment.

Referring to FIG. 1, an adsorption type air dryer 1 according to an embodiment may include all or some of an inlet 11, an outlet 12, a first valve assembly 13, a first adsorption tower 14, a second adsorption tower 15, a second valve assembly 16, and a controller 17. The adsorption type air dryer 1 according to an embodiment may also include a main line as described below.

The main line may interconnect the inlet 11 to the outlet 12, and compressed air may flow therein. For example, the compressed air introduced through the inlet 11 may sequentially pass through the first valve assembly 13, the first adsorption tower 14 or the second adsorption tower 15, and the second valve assembly 16 and exit through the outlet 12. The main line may sequentially interconnect the first valve assembly 13, the first adsorption tower 14 or the second adsorption tower 15, and the second valve assembly 16 such that the compressed air flows therethrough. The first valve assembly 13, the first adsorption tower 14, the second adsorption tower 15, and the second valve assembly 16 may be installed on the main line, wherein the first adsorption tower 14 is on a first branch of the main line and the second adsorption tower 15 is on a second branch of the main line.

The first adsorption tower 14 and/or the second adsorption tower 15 may perform a compressed air dehumidification process or an adsorbent regeneration process. According to an embodiment, the first adsorption tower 14 and the second adsorption tower 15 may alternately perform a compressed air dehumidification process or an adsorbent regeneration process. For example, when the first adsorption tower 14 performs a compressed air dehumidification process, the second adsorption tower 15 may perform an adsorbent regeneration process. Alternatively, when the second adsorption tower 15 performs a compressed air dehumidification process, the first adsorption tower 14 may perform an adsorbent regeneration process.

The first valve assembly 13 may include a plurality of valves. For example, the first valve assembly 13 may include one redirecting valve 131 and a plurality of valves 132 and 133. Compressed air may be supplied to the first adsorption tower 14 or the second adsorption tower 15 according to the operation of the first valve assembly 13.

Humid compressed air that passes through the inlet 11 may be supplied to the first adsorption tower 14 by the first valve assembly 13. The humid compressed air may be dried while passing through the first adsorption tower 14. Dried compressed air may be discharged from the top of the first adsorption tower 14. The dried compressed air discharged from the top of the first adsorption tower 14 may be discharged through the outlet 12 by the second valve assembly 16. Here, the second valve assembly 16 may include a plurality of check valves.

Also, according to the operation of the redirecting valve 131 of the first valve assembly 13, humid compressed air that passes through the inlet 11 may be supplied to the second adsorption tower 15. The humid compressed air may be dried while passing through the second adsorption tower 15. Dried compressed air may be discharged from the top of the second adsorption tower 15. The dried compressed air discharged from the top of the second adsorption tower 15 may be discharged through the outlet 12 by the second valve assembly 16.

While the first adsorption tower 14 performs a compressed air dehumidification process, the second adsorption tower 15 may perform an adsorbent regeneration process. Alternatively, while the second adsorption tower 15 performs a compressed air dehumidification process, the first adsorption tower 14 may perform an adsorbent regeneration process.

The adsorbent regeneration process may include a heating process and a cooling process. Referring to FIG. 1, the adsorption type air dryer 1 according to an embodiment may include a regeneration line 181 and a heater 182.

The regeneration line 181 may be branched at a position adjacent to the outlet 12 of the main line. The regeneration line 181 may be branched at a position adjacent to the outlet 12 and may use some of the compressed air discharged out of the adsorption type air dryer 1. The regeneration line 181 may include the heater 182.

The adsorbent regeneration process may include a heating process and a cooling process. In the heating process, a part of dried compressed air flowing toward the outlet 12 may be heated by the heater 182 and used.

Heated compressed air may pass through the second valve assembly 16 and be supplied to the upper portion of the first adsorption tower 14 or the second adsorption tower 15 in which the adsorbent regeneration process is performed. For example, when the compressed air dehumidification process is being performed in the first adsorption tower 14, the heated compressed air may be supplied to the second adsorption tower 15. Alternatively, when the compressed air dehumidification process is being performed in the second adsorption tower 15, the heated compressed air may be supplied to the first adsorption tower 14.

The heated compressed air may pass through the first adsorption tower 14 or the second adsorption tower 15 from the top to the bottom. At this time, the adsorbent inside the first adsorption tower 14 or the second adsorption tower 15 may be dried. Compressed air that passed through the first adsorption tower 14 or the second adsorption tower 15 may pass through the first valve assembly 13 and be discharged into the atmosphere through an exhaust port 19.

According to an embodiment, a cooling process may be performed after the heating process. In the cooling process, a part of dried compressed air flowing through the outlet 12 may be branched into the regeneration line 181 and used without being heated by the heater 182.

The compressed air from the regeneration line 181 may pass through the second valve assembly 16 and be supplied to the upper portion of the first adsorption tower 14 or the second adsorption tower 15 in which the adsorbent regeneration process is performed. For example, when the compressed air dehumidification process is being performed in the first adsorption tower 14, the compressed air from the regeneration line 181 may be supplied to the second adsorption tower 15. Alternatively, when the compressed air dehumidification process is being performed in the second adsorption tower 15, the compressed air from the regeneration line 181 may be supplied to the first adsorption tower 14.

The compressed air from the regeneration line 181 may pass through the first adsorption tower 14 or the second adsorption tower 15 from the top to the bottom. At this time, the adsorbent inside the first adsorption tower 14 or the second adsorption tower 15 may be cooled. Compressed air that passed through the first adsorption tower 14 or the second adsorption tower 15 may pass through the first valve assembly 13 and be discharged into the atmosphere through the exhaust port 19.

However, the heating process and the cooling process of the regeneration process are not limited to the above-stated examples and may be designed in various ways as needed. For example, compressed air during the heating process may join compressed air flowing into the inlet 11 without being discharged into the atmosphere through the exhaust port 19. Additionally, external air may be utilized instead of compressed air during the heating process. Also, compressed air during the cooling process may join compressed air flowing toward the outlet 12 without being discharged into the atmosphere through the exhaust port 19.

The controller 17 of the adsorption type air dryer 1 according to the present disclosure may use the moisture load rate(s) of the first adsorption tower 14 and/or the second adsorption tower 15 to control the operations of the first adsorption tower 14 and the second adsorption tower 14. At this time, the moisture load rate may be a ratio of a pre-set moisture removal amount with respect to the accumulated moisture removal amount accumulated in an adsorption tower (refer to Equation 1 below). For example, a first moisture load rate may be a ratio of a pre-set moisture removal amount with respect to a first accumulated moisture removal amount accumulated in the first adsorption tower 14. A second moisture load rate may be a ratio of a pre-set moisture removal amount with respect to a second accumulated moisture removal amount accumulated in the second adsorption tower 15.

At this time, a pre-set moisture removal amount is a design moisture removal amount of the adsorption type air dryer 1 and may be adjusted as needed. The pre-set moisture removal amount may be calculated by using a temperature, a flow rate, and a pressure of compressed air passing through an inlet and an outlet of the adsorption type air dryer 1. Here, design values may be input for the temperature, the flow rate, and the pressure of the compressed air, and detailed descriptions thereof will be described later. The pre-set moisture removal amount may be the same for both the first adsorption tower 14 and the second adsorption tower 15, but the present disclosure is not limited thereto.

According to an embodiment, the controller 17 may calculate the first accumulated moisture removal amount and/or the second accumulated moisture removal amount in real time. At this time, the first accumulated moisture removal amount and the second accumulated moisture removal amount may be calculated by using the temperature, the flow rate, and the pressure of compressed air passing through an inlet of the adsorption type air dryer 1. For example, the temperature, the flow rate, and the pressure of compressed air passing through the inlet of the adsorption type air dryer 1 may be measured in real time. Therefore, the first moisture load rate and/or the second moisture load rate of the adsorption type air dryer 1 may also be calculated in real time.

According to an embodiment, the adsorption type air dryer 1 may control the compressed air dehumidification process of the first adsorption tower 14 and the second adsorption tower 15 in real time by using the first moisture load rate and/or the second moisture load rate calculated in real time by the controller 17.

For example, when the controller 17 determines that the first moisture load rate exceeds a pre-set moisture load rate upper limit during the compressed air dehumidification process of the first adsorption tower 14, the controller 17 may stop the compressed air dehumidification process of the first adsorption tower 14. Also, the controller 17 may switch the flow of compressed air passing through an inlet of the adsorption type air dryer 1 from the first adsorption tower 14 to the second adsorption tower 15 to perform the compressed air dehumidification process. At this time, the controller 17 may control the first adsorption tower 14 to perform the adsorbent regeneration process.

When the controller 17 determines that the second moisture load rate exceeds the pre-set moisture load rate upper limit, the controller 17 may stop the compressed air dehumidification process of the second adsorption tower 15. Also, the controller 17 may switch the flow of compressed air passing through an inlet of the adsorption type air dryer 1 from the second adsorption tower 15 to the first adsorption tower 14 to perform the compressed air dehumidification process. At this time, the controller 17 may control the second adsorption tower 15 to perform the adsorbent regeneration process.

The controller 17 may increase or decrease the time for the compressed air dehumidification process of the first adsorption tower 14 or the second adsorption tower 15 by comparing the first moisture load rate or the second moisture load rate with the pre-set moisture load rate upper limit and the pre-set moisture load rate lower limit.

When the controller 17 determines that the first moisture load rate and/or the second moisture load rate exceeds the pre-set moisture load rate upper limit, the controller 17 may reduce the time for the compressed air dehumidification process.

For example, when the controller 17 determines that the first moisture load rate and/or the second moisture load rate exceeds the pre-set moisture load rate upper limit, the controller 17 may reduce the time for the compressed air dehumidification process as much as a set period of time. The reduced time for the compressed air dehumidification process may be reflected in a next compressed air dehumidification process.

When the controller 17 determines that the first moisture load rate and/or the second moisture load rate is less than the pre-set moisture load rate lower limit, the controller 17 may increase the time for the compressed air dehumidification process.

For example, when the controller 17 determines that the first moisture load rate and/or the second moisture load rate is less than the pre-set moisture load rate lower limit, the controller 17 may increase the time for the compressed air dehumidification process as much as a set period of time. The increased time for the compressed air dehumidification process may be reflected in a next compressed air dehumidification process.

Figure 2:
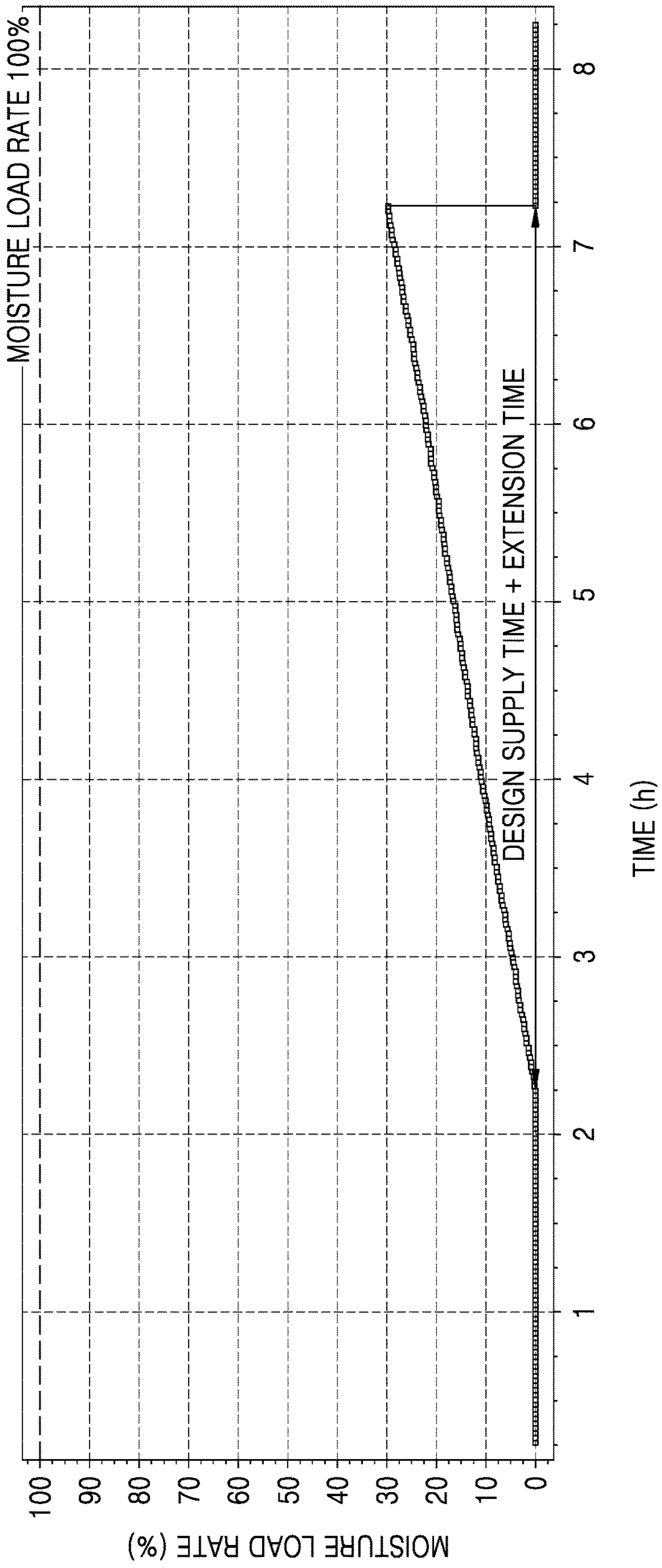
FIG. 2 is a graph showing a change in a moisture load rate according to a process time for dehumidifying compressed air of an adsorption type air dryer according to an embodiment.

FIG. 2 is a graph showing a change in a moisture load rate according to a process time for dehumidifying compressed air of an adsorption type air dryer according to an embodiment.

Referring to FIG. 2, the adsorption type air dryer 1 according to an embodiment may monitor a moisture load rate (a first moisture load rate and/or a second moisture load rate) in real time. As the time for a compressed air dehumidification process increases, the moisture load rate may increase. By monitoring the moisture load rate in real time, the time for the compressed air dehumidification process may be adjusted before the moisture load rate reaches the upper limit (i.e., 100%) of the pre-set moisture load rate. For example, when the moisture load rate does not reach the pre-set moisture load rate upper limit, the time for the compressed air dehumidification process may be extended.

According to an embodiment, the time for the compressed air dehumidification process of the adsorption type air dryer 1 may be designed to be 4 hours. Also, an extendable time for the compressed air dehumidification process may be designed to be 1 hour. By performing the compressed air dehumidification process for a time period (5 hours in total) longer than the designed time (4 hours) for the compressed air dehumidification process, the power consumption of the adsorption type air dryer 1 may be reduced.

Figure 3:
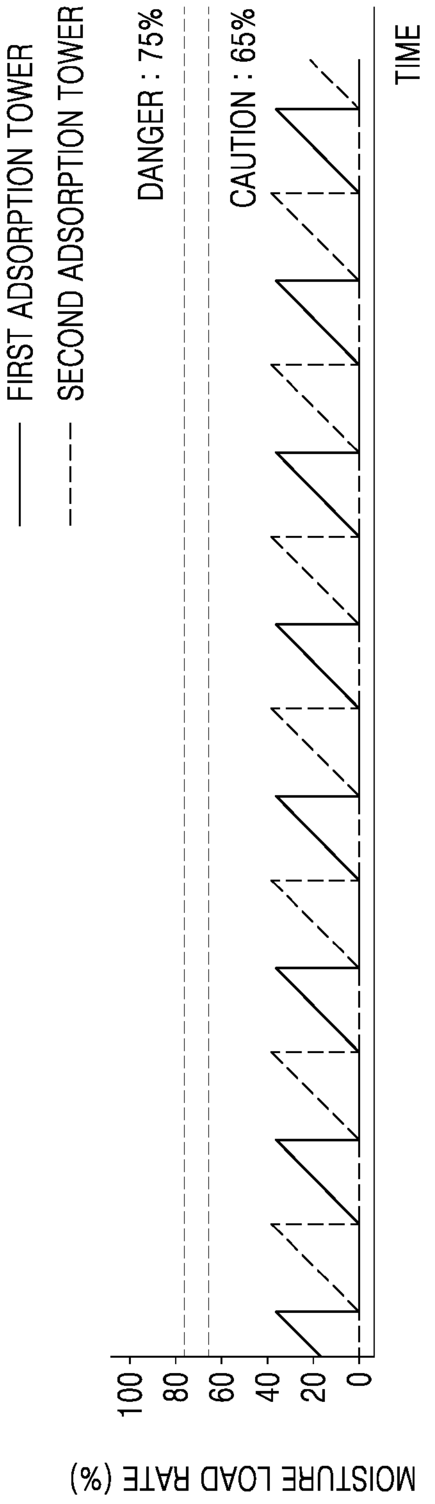
FIG. 3 is a graph showing real-time changes in moisture load rates of a first adsorption tower and a second adsorption tower of the adsorption type air dryer according to an embodiment.

FIG. 3 is a graph showing real-time changes in moisture load rates of a first adsorption tower and a second adsorption tower of an adsorption type air dryer according to an embodiment.

Referring to FIG. 3, an adsorption type air dryer according to the present disclosure may set one or more upper limits of the moisture load rate. For example, a point corresponding to the moisture load rate of 65% may be set as a first upper limit of the moisture load rate and a point corresponding to the moisture load rate of 75% may be set as a second upper limit of the moisture load rate.

In the adsorption type air dryer 1 according to the present disclosure, the first adsorption tower 14 and the second adsorption tower 15 may alternately perform a compressed air dehumidification process. Therefore, the controller 17 may alternately calculate a first moisture load rate of the first adsorption tower 14 and a second moisture load rate of the second adsorption tower 15. Here, the first moisture load rate and the second moisture load rate may be calculated in real time.

When the compressed air dehumidification process of the first adsorption tower 14 is stopped and switched to the compressed air dehumidification process of the second adsorption tower 15, the first adsorption tower 14 may perform an adsorbent regeneration process. At this time, the first moisture load rate of the first adsorption tower 14 may reach 0%.

When the compressed air dehumidification process of the second adsorption tower 15 is stopped and switched to the compressed air dehumidification process of the first adsorption tower 14, the second adsorption tower 15 may perform an adsorbent regeneration process. At this time, the second moisture load rate of the second adsorption tower 15 may reach 0%.

Referring to FIG. 3, in the adsorption type air dryer 1 according to the present disclosure, even when the first moisture load rate or the second moisture load rate does not exceed the pre-set moisture load rate upper limit (100%), the controller 17 may display a warning when the first moisture load rate or the second moisture load rate exceeds a certain moisture load rate. For example, the controller 17 may display a caution-level warning when the first moisture load rate of the first adsorption tower 14 or the second moisture load rate of the second adsorption tower 15 exceeds the first upper limit of the moisture load rate. Also, the controller 17 may display a danger-level warning when the first moisture load rate of the first adsorption tower 14 or the second moisture load rate of the second adsorption tower 15 exceeds the second upper limit of the moisture load rate.

Figure 4:
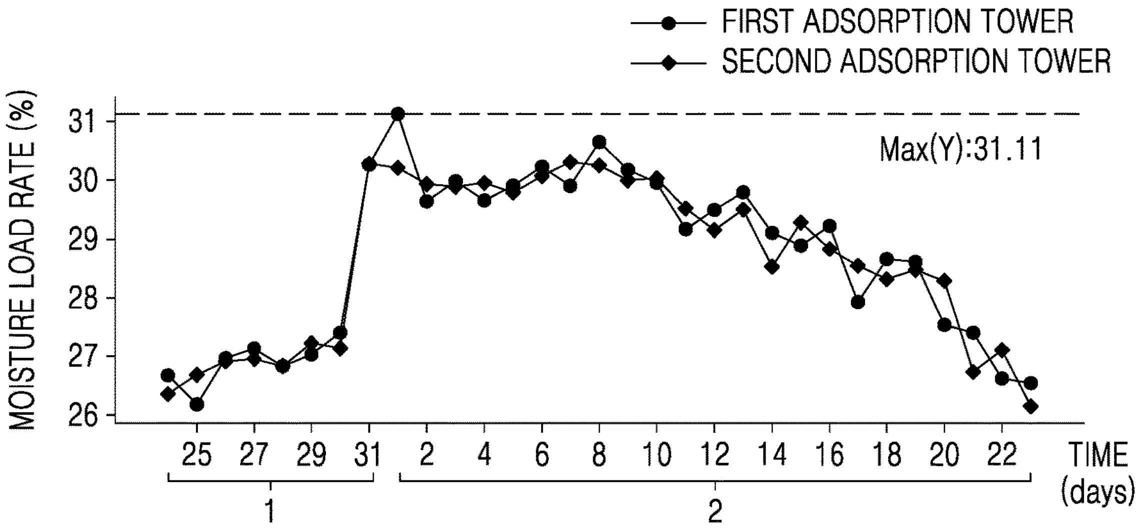
FIG. 4 is a graph showing a change in daily maximum moisture change rate of an adsorption type air dryer according to an embodiment.

FIG. 4 is a graph showing a change in daily maximum moisture change rate of an adsorption type air dryer according to an embodiment.

Referring to FIG. 4, the daily maximum moisture load rate of the adsorption type air dryer 1 may be accumulated and recorded. By recording the daily maximum moisture load rates of the first adsorption tower 14 and the second adsorption tower 15 of the adsorption type air dryer 1, the adsorption type air dryer 1 may be effectively driven.

For example, in a period in which the daily maximum moisture load rate is low, a pre-set time for a compressed air dehumidification process may be extended. Also, in a period in which the daily maximum moisture load rate is high, the pre-set time for a compressed air dehumidification process may be reduced.

Figure 5:
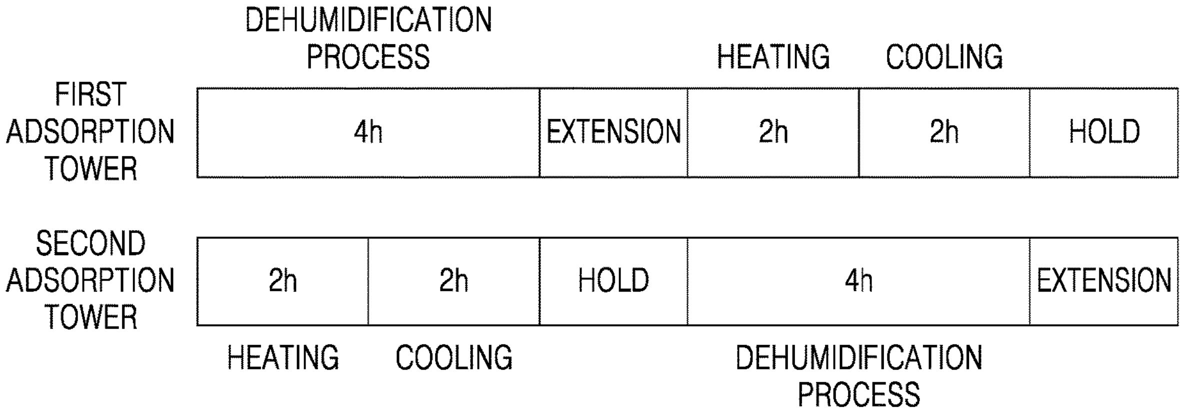
FIG. 5 is a diagram showing the operations of a first adsorption tower and a second adsorption tower of an adsorption type air dryer according to an embodiment.

FIG. 5 is a diagram showing the operations of a first adsorption tower and a second adsorption tower of an adsorption type air dryer according to an embodiment.

Referring to FIG. 5, in the adsorption type air dryer 1 according to the present disclosure, the first adsorption tower 14 and the second adsorption tower 15 may operate in correspondence to each other. In correspondence to a compressed air dehumidification process and an adsorbent regeneration process of the first adsorption tower 14, the second adsorption tower 15 may perform a compressed air dehumidification process and an adsorbent regeneration process.

During a time period (4 hours) in which the first adsorption tower 14 performs a compressed air dehumidification process, the second adsorption tower 15 may perform an adsorbent regeneration process. Also, during a time period (4 hours) in which the second adsorption tower 15 performs a compressed air dehumidification process, the first adsorption tower 14 may perform an adsorbent regeneration process. As described above, the adsorbent regeneration process may include a heating process and a cooling process. The heating process and the cooling process may each be performed for 2 hours, but the present disclosure is not limited thereto.

The adsorption type air dryer 1 according to the present disclosure may adjust the time for a compressed air dehumidification process by calculating and using the moisture load rate in real time. For example, when the moisture load rate does not reach the pre-set moisture load rate upper limit, the time for the compressed air dehumidification process may be extended. When the time for the compressed air dehumidification process of the first adsorption tower 14 is extended, the first adsorption tower 14 may perform the compressed air dehumidification process for the extended time, and the second adsorption tower 15 that completed the adsorbent regeneration process may stand by for the extended time. When the time for the compressed air dehumidification process of the second adsorption tower 15 is extended, the second adsorption tower 15 may perform the compressed air dehumidification process for the extended time, and the first adsorption tower 14 that completed the adsorbent regeneration process may stand by for the extended time.

An adsorption type air dryer according to the comparative example consumes high power for an adsorbent regeneration process of an adsorption tower. The adsorption type air dryer 1 according to the present disclosure may reduce the time for an adsorbent regeneration process by calculating the moisture load rate in real time and adjusting the time for a compressed air dehumidification process. While standing by, the first adsorption tower 14 or the second adsorption tower 15 does not perform an adsorbent regeneration process, thereby reducing the power consumption of the adsorption type air dryer 1. Also, since a part of compressed air discharged through the outlet 12 is used, the amount of compressed air used may be reduced by reducing the time for an adsorbent regeneration process.

Figure 6:
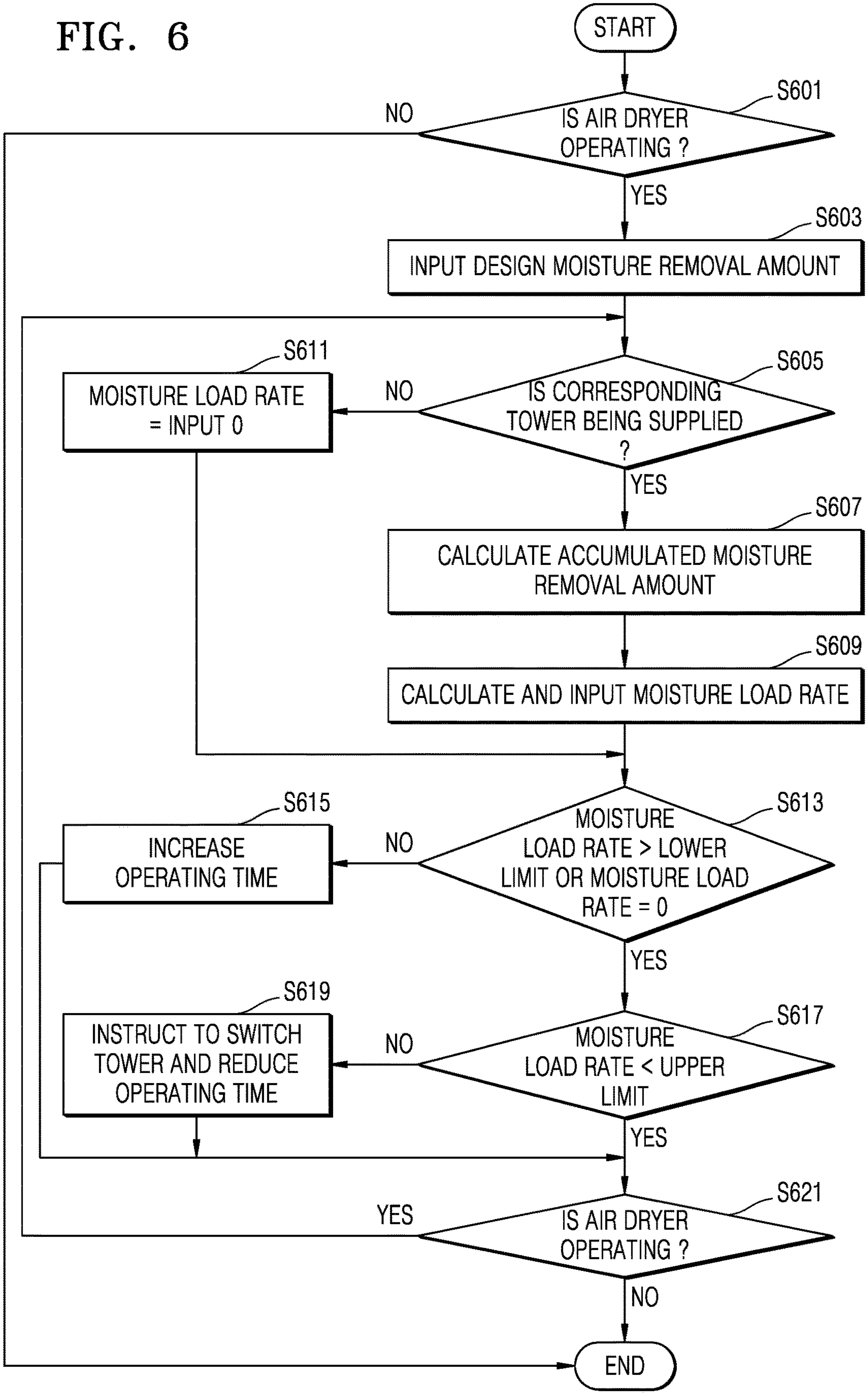
FIG. 6 is a flowchart of a method of controlling of an adsorption type air dryer, according to an embodiment.

FIG. 6 is a flowchart of a method of controlling an adsorption type air dryer, according to an embodiment.

Referring to FIG. 6, the method of controlling the adsorption type air dryer 1 according to an embodiment may include determining whether the adsorption type air dryer 1 is operating (operation S601). For example, the controller 17 may determine that the adsorption type air dryer 1 is operating when the flow rate of compressed air passing through the outlet 12 exceeds 0.

The method of controlling the adsorption type air dryer 1 may include inputting a pre-set moisture removal amount (hereinafter, referred to as "design moisture removal amount") (operation S603). Detailed descriptions related to the operation of inputting the design moisture removal amount are given below.

The method of controlling the adsorption type air dryer 1 may include determining which of the first adsorption tower 14 and the second adsorption tower 15 is being supplied (operation S605). Here, an adsorption tower being supplied may refer to an adsorption tower performing a compressed air dehumidification process from between the first adsorption tower 14 and the second adsorption tower 15.

The method of controlling the adsorption type air dryer 1 may include calculating an accumulated moisture removal amount (operation S607). An adsorption tower being supplied may be determined, and then the accumulated moisture removal amount of the adsorption tower being supplied may be calculated. For example, when it is determined that the first adsorption tower 14 is an adsorption tower being supplied, a first accumulated moisture removal amount accumulated in the first adsorption tower 14 may be calculated. When it is determined that the second adsorption tower 15 is an adsorption tower being supplied, a second accumulated moisture removal amount accumulated in the second adsorption tower 15 may be calculated. Detailed descriptions related to the operation of calculating an accumulated moisture removal amount are given below.

The method of controlling the adsorption type air dryer 1 may include calculating and inputting a moisture load rate (operation S609) to the controller 17. The controller 17 may calculate the first moisture load rate by using the design moisture removal amount and the first accumulated moisture removal amount. The controller 17 may calculate the second moisture load rate by using the design moisture removal amount and the second accumulated moisture removal amount.

The moisture load rate may be calculated using Equation 1 below. In detail, the moisture load rate may be calculated by using a design moisture removal amount SD according to Equation 2 below and an accumulated moisture removal amount S according to Equation 7 below. Each of the first moisture load rate and the second moisture load rate may be calculated by using Equation 1 below.

$$\text{Moisture load rate} = \frac{S}{SD \times 0.85} \times 100 \qquad \text{[Equation 1]}$$

(Here, S denotes the accumulated moisture removal amount, SD denotes the design moisture removal amount, and 0.85 is a value considering the safety rate of 15% of an air dryer)

In the operation of determining which of the adsorption towers is being supplied, the moisture load rate of an adsorption tower not being supplied may be input as 0 (operation S611). In other words, the moisture load rate of an adsorption tower performing an adsorbent regeneration process may be input as 0.

According to the method of controlling the adsorption type air dryer 1, it may be determined whether the moisture load rate exceeds a pre-set moisture load rate lower limit (operation S613). The moisture load rate calculated by using Equation 1 may be compared with the pre-set moisture load rate lower limit.

When the moisture load rate does not exceed the pre-set moisture load rate lower limit, the time for the compressed air dehumidification process may be extended (operation S615). An existing time for the compressed air dehumidification process may be increased as much as a pre-set extension time. The increased time for the compressed air dehumidification process may be reflected in a next compressed air dehumidification process.

When the moisture load rate exceeds the pre-set moisture load rate lower limit, it may be determined whether the moisture load rate is less than a pre-set moisture load rate upper limit (operation S617). The moisture load rate calculated by using Equation 1 may be compared with the pre-set moisture load rate upper limit.

When the moisture load rate is not less than the pre-set moisture load rate upper limit, the time for the compressed air dehumidification process may be reduced (operation S619). At this time, the compressed air dehumidification process of the adsorption tower that was performing the compressed air dehumidification process may be stopped, and it may be switched to the other adsorption tower to perform the compressed air dehumidification process. The existing time for the compressed air dehumidification process may be reduced as much as a pre-set reduction time. The reduced time for the compressed air dehumidification process may be reflected in a next compressed air dehumidification process.

Thereafter, the algorithm may be repeated by performing an operation of determining whether the adsorption type air dryer 1 is operating (operation S621). The first adsorption tower 14 and the second adsorption tower 15 may alternately perform the compressed air dehumidification process. In this process, the moisture load rate may be calculated in real time and compared with the pre-set moisture load rate upper limit and the pre-set moisture load rate lower limit. Also, the time for the compressed air dehumidification process may be increased or reduced and reflected in a next operation.

Figure 7:
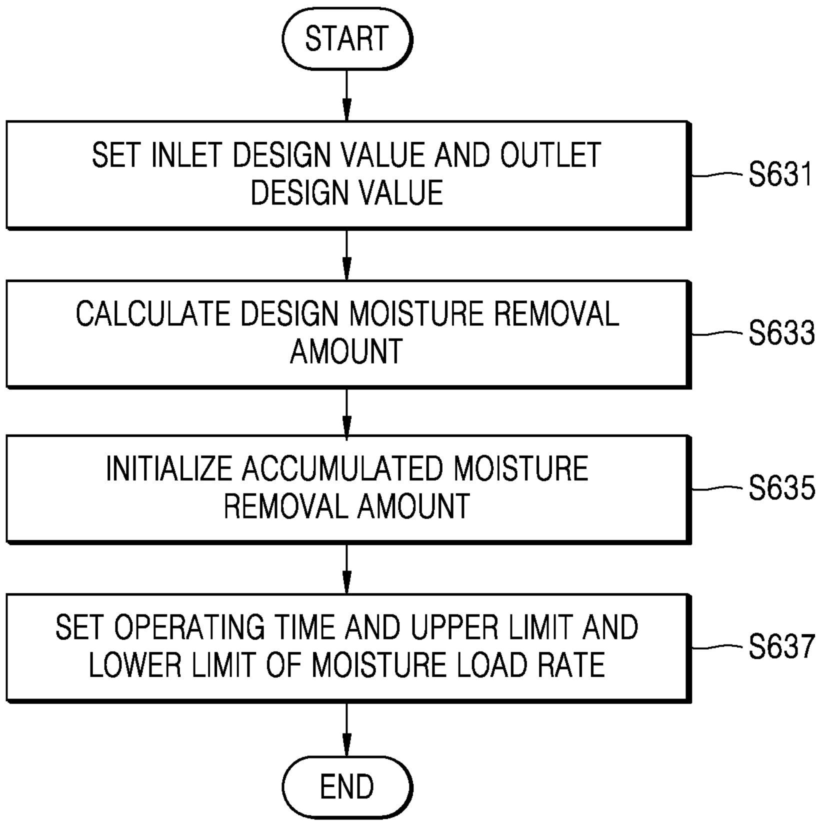
FIG. 7 is a flowchart showing an operation of inputting a design moisture removal amount in the method of controlling an adsorption type air dryer, according to an embodiment.

FIG. 7 is a flowchart showing an operation of inputting a design moisture removal amount in the method of controlling an adsorption type air dryer, according to an embodiment.

Referring to FIG. 7, the operation of inputting the design moisture removal amount may include setting an inlet design value and an outlet design value of the adsorption type air dryer 1 (operation S631). Operation of inputting the design moisture removal amount may include calculating the design moisture removal amount (operation S633).

Design values may be set for temperatures, flow rates, and pressures of a portion (A of FIG. 1) of the adsorption type air dryer 1 adjacent to the inlet 11 and a portion (B of FIG. 1) of the adsorption type air dryer 1 adjacent to the outlet 12. The design moisture removal amount may be set by using Equation 2 below.

$$\text{Design moisture removal amount } SD = (A_{design} - A_{outlet}) \times W_{design} \times t_{design} \quad \text{[Equation 2]}$$

Here, the value $A_{design}$ may be the absolute humidity according to the design temperature and the relative humidity of the portion (A of FIG. 1) of the adsorption type air dryer 1 adjacent to the inlet 11. For example, the value $A_{design}$ is the absolute humidity when the design temperature is 40° C. and the relative humidity is 85%. The value $A_{outlet}$ is the absolute humidity according to the design temperature of the portion (B of FIG. 1) of the adsorption type air dryer 1 adjacent to the outlet 12. For example, the value $A_{outlet}$ may be the absolute humidity when the design dew point temperature is −100° C. The value $W_{design}$ is the flow rate of compressed air at the portion (A of FIG. 1) of the adsorption type air dryer 1 adjacent to the inlet 11. For example, the value $W_{design}$ may be 14,000 $m^3$/h. The value $t_{design}$ may be the design supply time of the adsorption type air dryer 1. The design supply time is the time for performing a compressed air dehumidification process and may be, for example, 4 hours.

Inlet design values and outlet design values of the adsorption type air dryer 1 may be input to the controller 17, and the design moisture removal amount may be calculated by using Equation 1.

An operation of inputting the design moisture removal amount may include initializing an accumulated moisture removal amount (operation S635). Prior to the calculation of the moisture load rate, the first accumulated moisture removal amount of the first adsorption tower 14 and the second accumulated moisture removal amount of the second adsorption tower 15 may be initialized. The first accumulated moisture removal amount of the first adsorption tower 14 and the second accumulated moisture removal amount of the second adsorption tower 15 may be input as 0.

An operation of inputting the design moisture removal amount to the controller 17 may include setting an operating time and an upper limit and a lower limit of the moisture load rate (operation S637). The operating time may refer to a period of time during which the first adsorption tower 14 or the second adsorption tower 15 performs a compressed air dehumidification process. For example, the operating time may be set to 4 hours but is not limited thereto.

The upper limit of the moisture load rate may be set. For example, the upper limit of the moisture load rate may be set to 100% but is not limited thereto. Also, a reduction time for the compressed air dehumidification process may be set in preparation for a case where the first moisture load rate or the second moisture load rate exceeds the upper limit of the moisture load rate.

The lower limit of the moisture load rate may be set. For example, the lower limit of the moisture load rate may be set to 30% but is not limited thereto. Also, an extension time for the compressed air dehumidification process may be set in preparation for a case where the first moisture load rate or the second moisture load rate is less than the lower limit of the moisture load rate.

Figure 8:
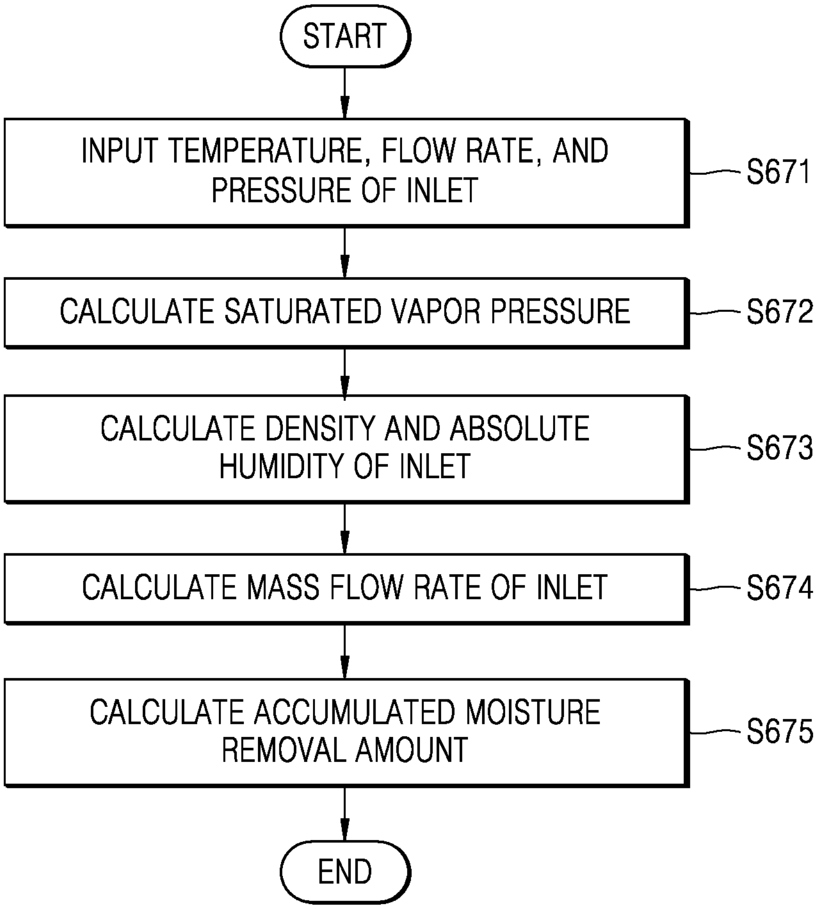
FIG. 8 is a flowchart showing an operation of calculating an accumulated moisture removal amount in the method of controlling an adsorption type air dryer, according to an embodiment.

FIG. 8 is a flowchart showing an operation of calculating an accumulated moisture removal amount in the method of controlling an adsorption type air dryer, according to an embodiment.

Referring to FIG. 8, an operation of calculating the accumulated moisture removal amount may include inputting a temperature, a flow rate, and a pressure of an inlet of the adsorption type air dryer 1 (operation S671). The temperature, the flow rate, and the pressure of the portion (A of FIG. 1) of the adsorption type air dryer 1 adjacent to the inlet 11 may be measured and input in real time.

An operation of calculating the accumulated moisture removal amount may include calculating saturated vapor pressure (operation S672). The saturated vapor pressure (kg/$cm^2$) may be calculated by using Equation 3 below.

$$\text{Saturated vapor pressure} = 0.61121 \times e^{\wedge}\left(\left(18.678 - \frac{Ti}{234.5}\right) \times \left(\frac{Ti}{257.14 + Ti}\right)\right) \times 0.0101972 \quad \text{[Equation 3]}$$

(Here, Ti denotes the temperature (° C.) of the portion (A of FIG. 1) adjacent to the inlet 11)

An operation of calculating the accumulated moisture removal amount may include calculating the density and the absolute humidity of an inlet (operation S673). The density (kg/$m^3$) of the inlet may be calculated by using Equation 4 below, and the absolute humidity of the inlet may be calculated by using Equation 5 below.

$$\text{Density } (r) = \frac{(1.0332 - \text{saturation vapor pressure}) \times 10^{\wedge}4}{29.97 \times (273 + Ti)} \quad \text{[Equation 4]}$$

(Here, Ti denotes the temperature (° C.) of the portion (A of FIG. 1) adjacent to the inlet 11)

$$\text{Absolute humidity } (A) = \frac{0.622 \times \text{saturation vapor pressure}}{(P + 1.0332 - \text{saturation vapor pressure})} \quad \text{[Equation 5]}$$

(Here, P denotes the pressure (kg/$cm^2$) of the portion (A of FIG. 1) adjacent to the inlet 11)

The operation of calculating the accumulated moisture removal amount may include calculating a mass flow rate of the inlet (operation S674). The mass flow rate (kg/h) of the inlet may be calculated by using Equation 6 below.

$$\text{Mass flow rate } (W) = Q \times r \quad \text{[Equation 6]}$$

(Here, Q denotes the volumetric flow rate ($m^3/h$) of compressed air at the portion (A of FIG. 1) adjacent to the inlet 11)

The method may include an operation of calculating the accumulated moisture removal amount (operation S675). The accumulated moisture removal amount (kg) may be calculated by using Equation 7 below.

$$\text{Accumulated moisture removal amount } (S) = (A - A_{outlet}) \times W \times t \qquad \text{[Equation 7]}$$

Here, the value A may be the saturated absolute humidity (relative humidity 100%) of the portion (A of FIG. 1) adjacent to the inlet 11 according to the temperature of the portion (A of FIG. 1) adjacent to the inlet 11. The absolute humidity A may be calculated by using Equation 5 above. The value $A_{outlet}$ is the absolute humidity according to the design temperature of the portion (B of FIG. 1) of the adsorption type air dryer 1 adjacent to the outlet 12. For example, the value $A_{outlet}$ may be the absolute humidity when the design dew point temperature is −100° C. The value W is the mass flow rate of compressed air at the portion (A of FIG. 1) of the adsorption type air dryer 1 adjacent to the inlet 11. The mass flow rate of the compressed air may be calculated by using Equation 6 above. The value t may be the supply time of the adsorption type air dryer 1. In this case, the supply time of the adsorption type air dryer 1 may be a time period for actually performing a compressed air dehumidification process.

At least one of the components, elements, modules, units, or the like (collectively "components" in this paragraph) represented by a block or an equivalent indication (collectively "block") in the drawings (for example, the controller 17 in FIG. 1) may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

While the present disclosure has been particularly shown and described with reference to embodiments thereof, it will be understood that various changes in form and details may be made therein without departing from the spirit and scope of the following claims.

What is claimed is:

1. An air dryer comprising:

a first adsorption tower configured to perform any one of a compressed air dehumidification process and a regeneration process of a first adsorbent provided therein;

a second adsorption tower configured to perform a regeneration process of a second adsorbent or alternately perform a compressed air dehumidification process, in response to an operation of the first adsorption tower; and a controller configured to: (i) control the operation of the first adsorption tower for the first adsorption tower to perform either the compressed air dehumidification process or the regeneration process of the first adsorbent; and (ii) control the operation of the second adsorption tower for the second adsorption tower to perform either the compressed air dehumidification process or the regeneration process of the second adsorbent, wherein the controller is configured to control at least one of the first adsorption tower and the second adsorption tower by using:

a first moisture load rate, which is a ratio of a first accumulated moisture removal amount accumulated in the first adsorption tower with respect to a pre-set moisture removal amount; and a second moisture load rate, which is a ratio of a second accumulated moisture removal amount accumulated in the second adsorption tower with respect to the pre-set moisture removal amount;

wherein (i) based on determining that the first moisture load rate or the second moisture load rate exceeds a pre-set moisture load rate upper limit, the controller is configured to reduce a time for the respective compressed air dehumidification process, or (ii) based on determining that the first moisture load rate or the second moisture load rate is less than a pre-set moisture load rate lower limit, the controller is configured to extend the time for the respective compressed air dehumidification process.

2. The air dryer of claim 1, wherein, based on determining that the first moisture load rate exceeds the pre-set moisture load rate upper limit, the controller is configured to stop the compressed air dehumidification process of the first adsorption tower and switch to the compressed air dehumidification process of the second adsorption tower, and, wherein based on determining that the second moisture load rate exceeds the pre-set moisture load rate upper limit, the controller is configured to stop the compressed air dehumidification process of the second adsorption tower and switch to the compressed air dehumidification process of the first adsorption tower.

3. The air dryer of claim 1, wherein, based on determining that the first moisture load rate or the second moisture load rate exceeds the pre-set moisture load rate upper limit, the controller is configured to reduce the time for the respective compressed air dehumidification process.

4. The air dryer of claim 1, wherein, based on determining that the first moisture load rate or the second moisture load rate is less than the pre-set moisture load rate lower limit, the controller is configured to extend the time for the respective compressed air dehumidification process.

5. The air dryer of claim 1, wherein the controller is configured to calculate the first moisture load rate and the second moisture load rate according to Equation 1 below:

$$\text{Moisture load rate} = \frac{S}{SD \times 0.85} \times 100 \qquad \text{[Equation 1]}$$

wherein S denotes a respective accumulated moisture removal amount and SD denotes a design moisture removal amount which is the pre-set moisture removal amount.

6. The air dryer of claim 1, wherein the pre-set moisture removal amount is calculated by using a pre-set temperature, a pre-set flow rate, a pre-set relative humidity, and a pre-set pressure of compressed air passing through an inlet and an outlet of the air dryer.

7. The air dryer of claim 1, wherein the first accumulated moisture removal amount and the second accumulated moisture removal amount are calculated by using a temperature, a flow rate, and a pressure of compressed air passing through an inlet and an outlet of the air dryer.

8. A method of controlling an air dryer using a first adsorption tower and a second adsorption tower, the method comprising:

inputting a pre-set moisture removal amount of the air dryer;

controlling operations of the first adsorption tower and the second adsorption tower, such that the first adsorption tower and the second adsorption tower perform any one of a compressed air dehumidification process or an adsorbent regeneration process;

calculating a first accumulated moisture removal amount accumulated in the first adsorption tower or a second accumulated moisture removal amount accumulated in the second adsorption tower; and calculating a first moisture load rate, which is a ratio of the first accumulated moisture removal amount accumulated in the first adsorption tower with respect to the pre-set moisture removal amount, or a second moisture load rate, which is a ratio of the second accumulated moisture removal amount accumulated in the second adsorption tower with respect to the pre-set moisture removal amount, wherein, in the controlling of the operations of the first adsorption tower and the second adsorption tower, the compressed air dehumidification process of the first adsorption tower or the second adsorption tower is controlled based on the first moisture load rate or the second moisture load rate, respectively, wherein the controlling of the compressed air dehumidification process of the first adsorption tower or the second adsorption tower based on the first moisture load rate or the second moisture load rate, respectively, comprises adjusting a time for the compressed air dehumidification process of the first adsorption tower and the second adsorption tower.

9. The method of claim 8, wherein, in the inputting of the pre-set moisture removal amount, the pre-set moisture removal amount is calculated by using a pre-set temperature, a pre-set flow rate, a pre-set relative humidity, and a pre-set pressure of compressed air passing through an inlet and an outlet of the air dryer.

10. The method of claim 8, wherein the controlling of the operations of the first adsorption tower and the second adsorption tower further comprises determining whether the first adsorption tower or the second adsorption tower is operating.

11. The method of claim 8, wherein, in the controlling of the operations of the first adsorption tower and the second adsorption tower, the first adsorption tower and the second adsorption tower are controlled to alternately perform the adsorbent regeneration process or the compressed air dehumidification process in correspondence with each other.

12. The method of claim 8, wherein, in the calculating of the first accumulated moisture removal amount or the second accumulated moisture removal amount, a moisture removal amount accumulated inside the first adsorption tower or the second adsorption tower is calculated in real time.

13. The method of claim 8, wherein, in the calculating of the first accumulated moisture removal amount or the second accumulated moisture removal amount, the first accumulated moisture removal amount or the second accumulated moisture removal amount is calculated by using a temperature, a flow rate, and a pressure of compressed air passing through an inlet and an outlet of the air dryer.

14. The method of claim 8, wherein the controlling of the compressed air dehumidification process of the first adsorption tower or the second adsorption tower based on the first moisture load rate or the second moisture load rate, respectively, further comprises comparing the first moisture load rate or the second moisture load rate with a pre-set moisture load rate upper limit and a pre-set moisture load rate lower limit.

15. The method of claim 14, wherein, in the calculating of the first moisture load rate and the second moisture load rate, the method comprises calculating the first moisture load rate and the second moisture load rate according to Equation 1 below:

$$\text{Moisture load rate} = \frac{S}{SD \times 0.85} \times 100 \qquad \text{[Equation 1]}$$

wherein S denotes the first or second accumulated moisture removal amount and SD denotes a design moisture removal amount which is the pre-set moisture removal amount.

16. The method of claim 14, wherein, in the adjusting of the time for the compressed air dehumidification process of the first adsorption tower and the second adsorption tower, based on determining that the first moisture load rate or the second moisture load rate exceeds the pre-set moisture load rate upper limit, the time for the compressed air dehumidification process of the first adsorption tower or the second adsorption tower is reduced.

17. The method of claim 14, wherein, in the adjusting of the time for the compressed air dehumidification process of the first adsorption tower and the second adsorption tower, based on determining that the first moisture load rate or the second moisture load rate is less than the pre-set moisture load rate lower limit, the time for the compressed air dehumidification process of the first adsorption tower or the second adsorption tower is extended.

18. An air dryer comprising:

a main line interconnecting an inlet and an outlet and through which compressed air flows;

a first adsorption tower installed on a first branch of the main line and configured to perform any one of a compressed air dehumidification process and a regeneration process of an adsorbent provided therein;

a second adsorption tower installed on a second branch of the main line and configured to perform a regeneration process of an adsorbent or alternately perform a compressed air dehumidification process, in response to an operation of the first adsorption tower;

a regeneration line branched from a position of the main line adjacent to the outlet and comprising a heater; and a controller configured to control operations of the first adsorption tower and the second adsorption tower, such that the first adsorption tower and the second adsorption tower perform any one of the compressed air dehumidification process or the adsorbent regeneration process, wherein the controller is configured to control at least one of the first adsorption tower and the second adsorption tower by using:

a first moisture load rate, which is a ratio of a first accumulated moisture removal amount accumulated in the first adsorption tower with respect to a pre-set moisture removal amount; and a second moisture load rate, which is a ratio of a second accumulated moisture removal amount accumulated in the second adsorption tower with respect to the pre-set moisture removal amount, and the first moisture load rate and the second moisture load rate are calculated according to Equation 1 below:

$$\text{Moisture load rate} = \frac{S}{SD \times 0.85} \times 100 \qquad \text{[Equation 1]}$$

wherein S denotes a respective accumulated moisture removal amount and SD denotes a design moisture removal amount which is the pre-set moisture removal amount.

19. The air dryer of claim 18, wherein, based on determining that the first moisture load rate exceeds a pre-set moisture load rate upper limit, the controller is configured to stop the compressed air dehumidification process of the first adsorption tower and switch to the compressed air dehumidification process of the second adsorption tower, and, wherein, based on determining that the second moisture load rate exceeds the pre-set moisture load rate upper limit, the controller is configured to stop the compressed air dehumidification process of the second adsorption tower and switch to the compressed air dehumidification process of the first adsorption tower.

* * * * *